(12) United States Patent
Magnusson (10) Patent No.: US 9,745,144 B2
(45) Date of Patent: Aug. 29, 2017

(54) DIVIDER ARRANGEMENT FOR GUIDING PACKAGES BETWEEN AT LEAST TWO CONVEYOR BELTS, AND METHOD OF CONTROLLING THE SAME

(71) Applicant: TETRA LAVAL HOLDINGS & FINANCE S.A., Pully (CH)

(72) Inventor: Johan Magnusson, Malmö (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 14/904,652

(22) PCT Filed: May 16, 2014

(86) PCT No.: PCT/EP2014/060046
§ 371 (c)(1),
(2) Date: Jan. 12, 2016

(87) PCT Pub. No.: WO2015/003838
PCT Pub. Date: Jan. 15, 2015

(65) Prior Publication Data
US 2016/0145054 A1  May 26, 2016

(30) Foreign Application Priority Data
Jul. 12, 2013  (SE) ..................... 1350877

(51) Int. Cl.
*B65G 47/71* (2006.01)
*B65G 47/68* (2006.01)
*B65G 47/76* (2006.01)

(52) U.S. Cl.
CPC ........... *B65G 47/71* (2013.01); *B65G 47/682* (2013.01); *B65G 47/766* (2013.01)

(58) Field of Classification Search
CPC .... B65G 47/682; B65G 47/71; B65G 47/715; B65G 47/22; B65G 47/766
USPC .......... 198/890, 367, 442, 457.06, 456, 606, 198/817, 626.1
See application file for complete search history.

(56) References Cited

U.S. PATENT DOCUMENTS 3,193,078 A * 7/1965 Amenta ................. B65G 47/71
198/419.1
4,723,649 A * 2/1988 Hartness ................ B65G 47/71
198/442

(Continued)

FOREIGN PATENT DOCUMENTS

CN  101112937 A  1/2008
DE  43 43 477 C1  8/1995

(Continued)

OTHER PUBLICATIONS

International Search Report (PCT/ISA/210) issued on Sep. 4, 2014, by the European Patent Office as the International Searching Authority for International Application No. PCT/EP2014/060046.

(Continued)

*Primary Examiner* — Gerald McClain
*Assistant Examiner* — Keith R Campbell
(74) *Attorney, Agent, or Firm* — Buchanan Ingersoll & Rooney PC (57) ABSTRACT

A divider arrangement, guide device, for guiding packages between at least two conveyor belts, and method of controlling the same is provided.

20 Claims, 9 Drawing Sheets

(56) References Cited

U.S. PATENT DOCUMENTS

| | | | | |
|---|---|---|---|---|
| 5,174,430 A | * | 12/1992 | Ebira | B65G 47/648 |
| | | | | 198/418.5 |
| 5,944,165 A | * | 8/1999 | Mannlein | B65G 47/71 |
| | | | | 198/367 |
| 8,939,273 B2 | * | 1/2015 | Thompson | B65G 47/648 |
| | | | | 198/367.1 |
| 2002/0189389 A1 | | 12/2002 | Asai et al. | |
| 2008/0023305 A1 | | 1/2008 | Wild et al. | |
| 2008/0035452 A1 | | 2/2008 | Spencers et al. | |
| 2008/0264759 A1 | | 10/2008 | Mignano | |
| 2016/0046452 A1 | * | 2/2016 | Parker | B65G 47/71 |
| | | | | 198/442 |

FOREIGN PATENT DOCUMENTS

| | | |
|---|---|---|
| EP | 1 054 188 A2 | 11/2000 |
| EP | 1439140 A1 | 7/2004 |
| EP | 1 985 558 A1 | 10/2008 |
| GB | 2 274 719 A | 8/1994 |
| GB | 2 391 535 A | 2/2004 |
| WO | 97/02931 A1 | 1/1997 |
| WO | 2007147005 A2 | 12/2007 |

OTHER PUBLICATIONS

Written Opinion (PCT/ISA/237) issued on Sep. 4, 2014, by the European Patent Office as the International Searching Authority for International Application No. PCT/EP2014/060046.

* cited by examiner

DIVIDER ARRANGEMENT FOR GUIDING PACKAGES BETWEEN AT LEAST TWO CONVEYOR BELTS, AND METHOD OF CONTROLLING THE SAME

TECHNICAL FIELD

The present invention relates to a divider arrangement for guiding packages to or from at least two conveyor belts.

BACKGROUND

In package distribution systems it is of importance to be able to move packages from one conveyor belt to another conveyor belt, e.g. when dividing up packages in batches for subsequent processing or packaging. To solve this problem it is known to provide a divider arrangement, moving packages to or from the conveyor belts to another conveyor belt. However, as the incoming packages has a certain speed whilst travelling on a package transporting conveyor belt, it very demanding to move the packages in an efficient way without moving the packages out of place or without undesirably rotating or tilting the packages during the move.

Hence, a cost efficient and robust divider arrangement which allows for less wear of the included components would be advantageous.

SUMMARY

It is, therefore, an object of the present invention to overcome or alleviate the above described problems.

In an aspect a divider arrangement is provided. The divider arrangement is arranged in connection to a package transporting conveyor belt for moving incoming packages from a first conveyor belt to a second conveyor belt. The first conveyor belt is arranged parallel and adjacent to the second conveyor belt. The divider arrangement comprises a guiding device including a pair of lower guide rails between which the packages may be transported by means of the first conveyor belt and/or the second conveyor belt. The guiding device is rigidly attached to a guiding belt being connected to two electric motors in an H-bot assembly for controllably moving the pair of lower guide rails over the first conveyor belt and second conveyor belt in a plane parallel to a top surface of the first conveyor belt and/or the second conveyor belt.

In another aspect a method of moving incoming packages in connection to a divider arrangement according to the first aspect is provided.

In a further aspect a computer-readable medium having embodied thereon a computer program for processing by a computer is provided. The computer program comprises code segments arranged for performing all of the steps of the method.

An object is to provide a robust divider arrangement for accurately and swiftly dividing incoming packages between at least two conveyor belts into batches, with reduced strain on the system and improved stability during the movement of the packages between the at least two conveyor belts.

BRIEF DESCRIPTION OF DRAWINGS

The above, as well as additional objects, features, and advantages of the present invention, will be better understood through the following illustrative and non-limiting detailed description of preferred embodiments of the present invention, with reference to the appended drawings, wherein.

DETAILED DESCRIPTION

An idea of the present invention is to provide for an improved divider arrangement to be arranged in a package conveyor distribution system. The improved divider arrangement acts to divide incoming packages between at least to conveyor belts by moving both longitudinally and laterally in view of the direction of movement of the incoming packages.

The improved divider arrangement has a telescopic functionality, allowing a part thereof including a guiding device, to extend or retract in a longitudinal manner thereby allowing the divider arrangement to accelerate up to a speed being the same as the speed of the incoming packages before moving in a lateral manner to steer the packages from one conveyor belt to the next.

Figure 1:
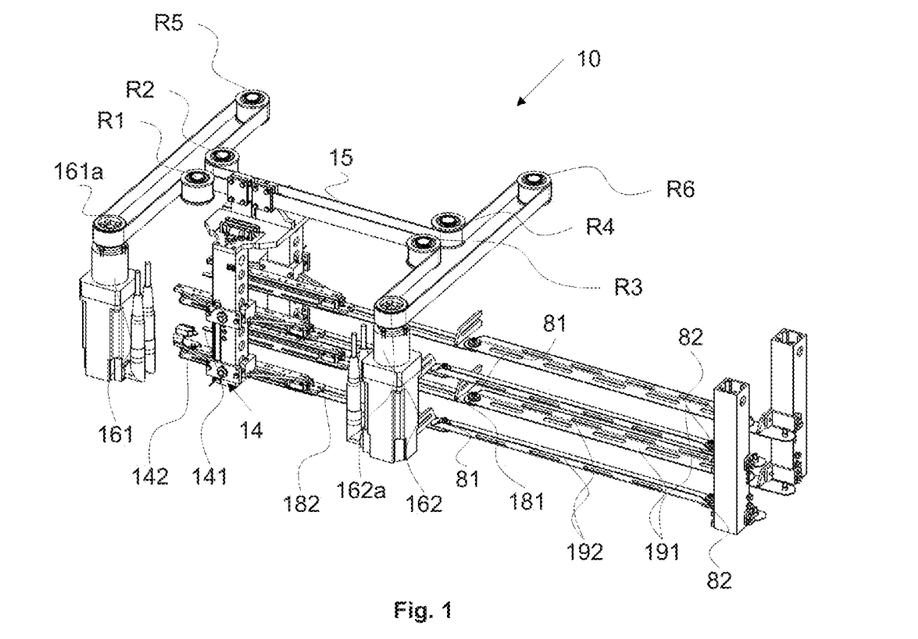
FIG. 1 is a schematic view of a divider arrangement according to an embodiment.

In an embodiment, according to FIG. 1, a divider arrangement 10 is provided. The divider arrangement 10 is arranged in connection to a package transporting conveyor belt 11, for moving incoming packages from a first conveyor belt 12 to at least a second conveyor belt 13. The first conveyor belt 12 is arranged parallel and adjacent to the second conveyor belt 13. The divider arrangement comprises a guiding device 14. The guiding device 14 is configured to move over the first conveyor belt 12 and second conveyor belt 13 in a plane being parallel to a top surface of the first conveyor belt 12 or second conveyor belt 13. The guiding device 14 comprises a pair of lower guide rails 141, 142 between which packages P may be transported by means of the first conveyor belt 12 and/or the second conveyor belt 13. The first pair of lower guide rails 141, 142 is arranged in parallel to the first conveyor belt 12 and the second conveyor belt 13. The guiding device 14 is rigidly attached to one guiding belt 15 being connected to two electric motors 161, 162 in an H-bot assembly for controllably moving the pair of lower guide rails 141, 142 over the first conveyor belt 12 and the second conveyor belt 13.

The first conveyor belt 12 and the second conveyor belt 13 are arranged in level such as to prevent a package moving from one conveyor belt to the other to experience a drop or climb to the other conveyor belt upon said movement. The leveled conveyor belts form a movement plane in which the packages may move from one conveyor belt to the other.

The first pair of lower guide rails 141, 142 is preferably arranged close to the top surface of the conveyor belts, e.g. close to and parallel to the movement plane. During the guiding movement of the guiding device one or both of the guide rails of the first pair of guide rails 141, 142 comes into with the packages, and act to push the packages laterally in relation to the direction of movement of either of the first and/or second conveyor belts. By arranging the first pair of lower guide rails 141, 142 close to the movement plane the risk of undesired tilting of the packages are reduced. Furthermore, for some packages, e.g. Tetra Prisma Aseptic (TPA), such a configuration has been shown to reduce undesired rotation of the packages during movement of the guiding device.

Figure 2:
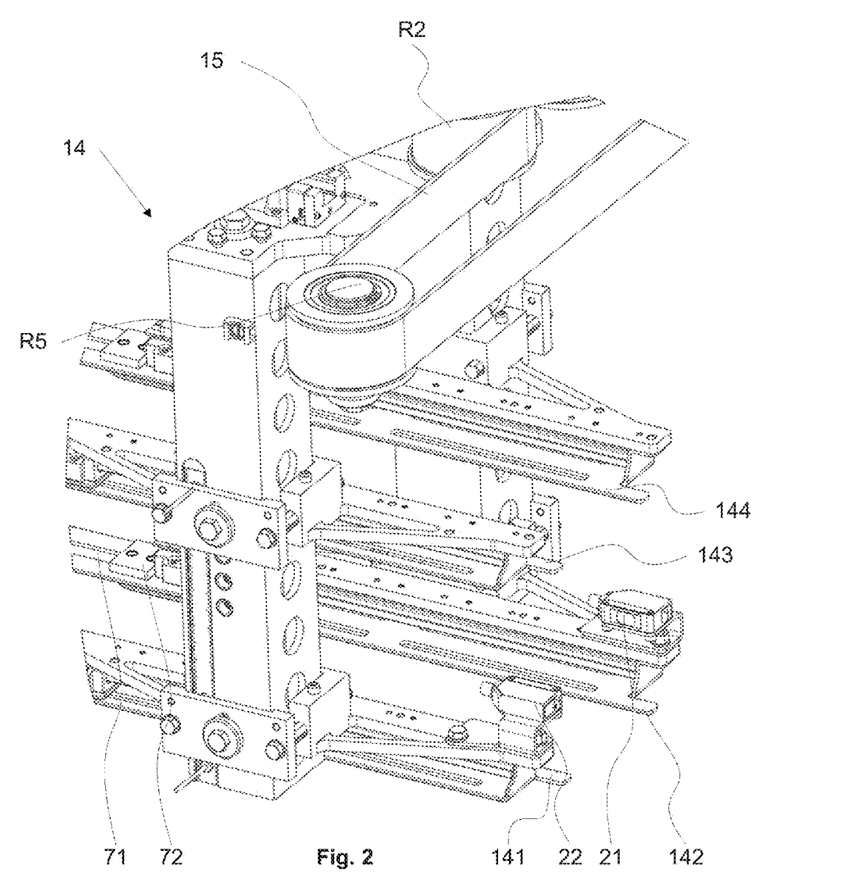
FIG. 2 is a schematic view of a divider arrangement according to an embodiment wherein the position of a sensor is shown.

In an embodiment, according to FIG. 2, the divider arrangement 10 further comprises a sensor 21. The sensor 21 is positioned at a distance from the forwardmost end of the pair of lower guide rails 141, 142. The sensor 21 is configured to detect the presence of a package being transported between the pair of lower guide rails 141, 142. The distance is not larger than depth of the package in the direction of movement. In this way, as long as the sensor maintains detection of the presence of the package, it is assured that the package is never positioned in front of the forwardmost position of the lower guide rails 141, 142. Furthermore, placing the sensor at a distance from the forwardmost end of the first pair of guide rails allow for achieving a smooth acceleration of the guiding device in a longitudinal manner, as will be explained more in detail below.

Besides being able to detect the presence of a package, it is required that the sensor 21 allows for the number of packages passing the sensor to be counted, e.g. by outputting a signal each time package passes the detector to a control unit which calculates the number of packages based on the sensor signals. Furthermore, the sensor signals sent from the sensor are used to activate the movement of the guiding device.

In an embodiment the distance from the forwardmost end is not larger than depth of the package in the direction of movement. In this way, as long as the sensor maintains detection of the presence of the package, it is assured that the package is never positioned in front of the forwardmost position of the lower guide rails 141, 142.

In an alternative embodiment, the distance from the forwardmost end may be larger than the depth of a package in the direction of movement. As the speed of the conveyor belts 12, 13 is known, it is possible to use a timer circuit to activate the movement of the guiding device at a later instance than the time at which a package passes the sensor, before the package reaches the forwardmost end of the lower guide rails.

As may be observed in FIG. 2, the sensor may be operatively connected to a light source 22, thereby allowing for light transmission detection. Alternatively, the sensor 21 may include a light source.

It should be appreciated that the sensor may be of any type suitable for detecting packages, and is thus not limited to light based sensor technology.

Figure 3:
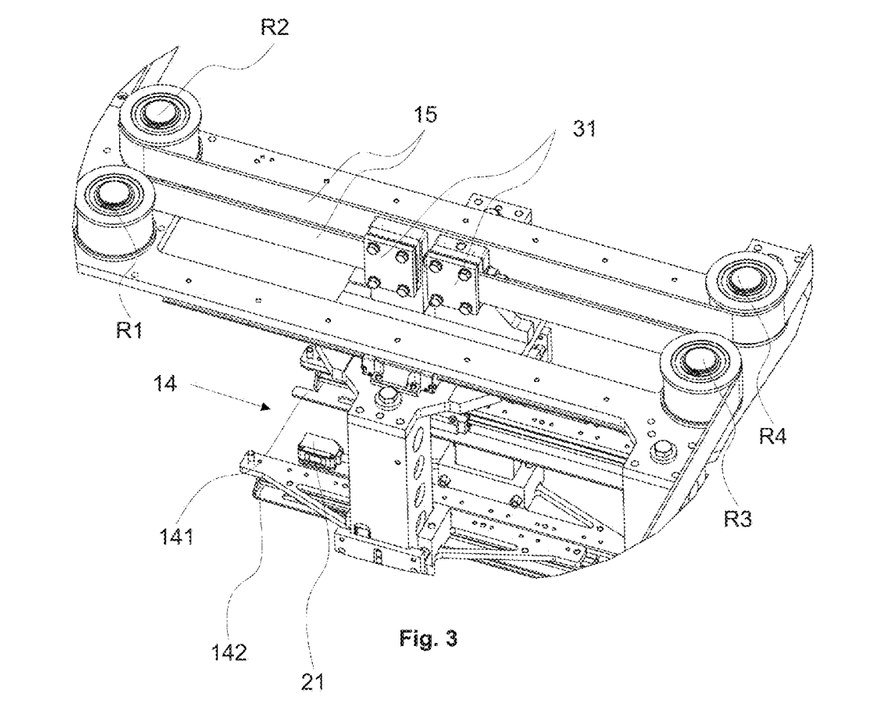
FIG. 3 is a schematic view of a divider arrangement according to an embodiment wherein the rigid attachment between the guiding device and guiding belt is shown.

In an embodiment, according to FIG. 3, the guiding device is rigidly attached to a single guiding belt 15 by means of an belt attachment member 31, 32. The single guiding belt 15 is arranged in an H-bot pattern or assembly. The H-bot assembly may be clearly observed in FIG. 1, as the guiding belt appears as the letter H when seen from the top of the divider assembly. At two positions along the guiding belt the two electric motors 161, 162 are connected. Each of the electric motors is positioned in the H-bot assembly. When only one electric motor is operating the guiding device 14 is moved along a 45 degree angle in view of the longitudinal axes of the first conveyor belt 12 and/or second conveyor belt 13.

When seen from the top, the mid horizontal section of the letter H formed by the H-bot pattern will move slightly up and down along the horizontal plane when the electric motors are operating. However, the vertical sections of the letter H formed by the H-bot pattern will look the same, although the roller wheels R1, R2, R3, R4 connected to the guiding belt will change position up and down along the horizontal plane when the electric motors are operating.

The H bot assembly may further comprise a number of roller wheels R1, R2, R3, R4, R5, R6, such as six roller wheels as shown in FIG. 3. The roller wheels R5, and R6 are stationary positioned in the horizontal plane (not shown) and may e.g. be attached to a rigid mounting construction. Hence, while allowing for rotation the roller wheels R5 and R6 do not change position in the horizontal plane when the electric motors are operated. On the other hand, roller wheels R1, R2, R3, R4 moves up and down along the horizontal plane when the electric motors are operated. The two electric motors 161, 162 are provided with drive wheels 161a, 162a.

Figure 4A:
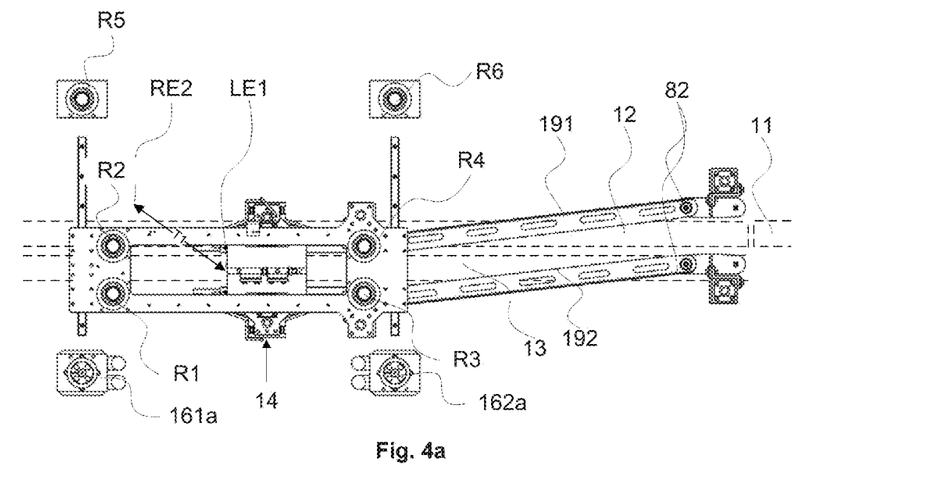
FIGS. 4*a* and 4*b* respectively illustrate a top view of the movement of the guiding device along a first 45 degree track T1 according to an embodiment.
Figure 4B:
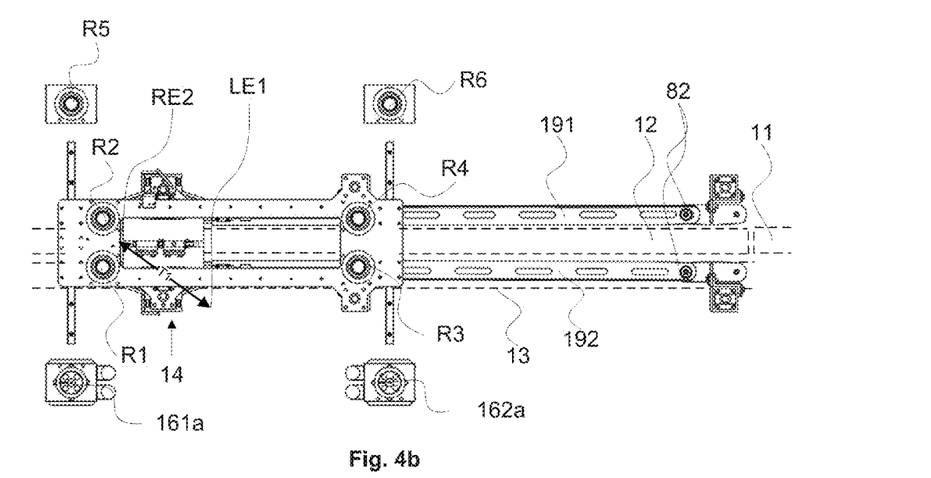

FIGS. 4a and 4b show a top view illustrating the resulting movement of the guiding device being initially position in a left hand side rearwardmost position LE1 as shown in FIG. 4a, when only a first of the two electric motors is operated. As may be noted the guiding device moves along first 45 degree track T1 in relation to the direction of the movement of the conveyor belts 12, 13 to a forwardmost right hand side position RE2 as shown in FIG. 4b. It may also be observed that the roller wheels R1, R2, R3, R4 move up in the horizontal plane between FIG. 4a and FIG. 4b, while the roller wheels R5, R6, and the drive wheels 161a, 162a remain stationary in the horizontal plane. This H-bot configuration allows for a steady and robust construction.

Figure 5A:
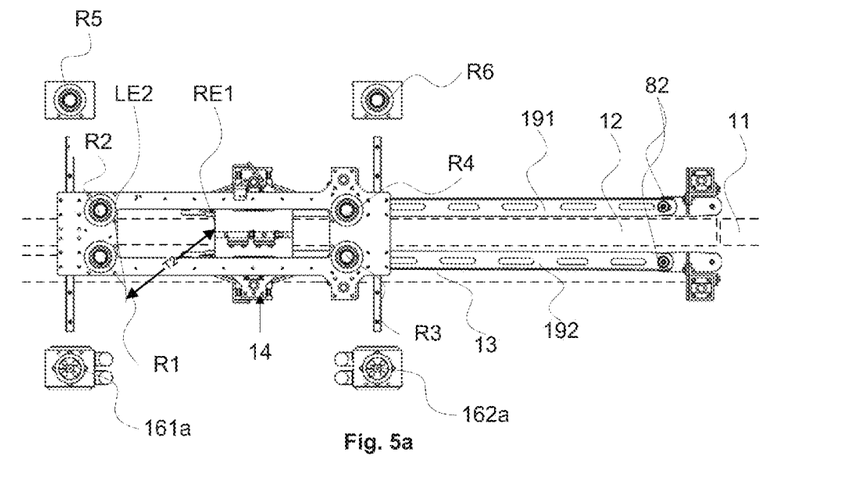
FIGS. 5*a* and 5*b* respectively illustrate a top view of the movement guiding device along a second 45 degree track T2 according to an embodiment.
Figure 5B:
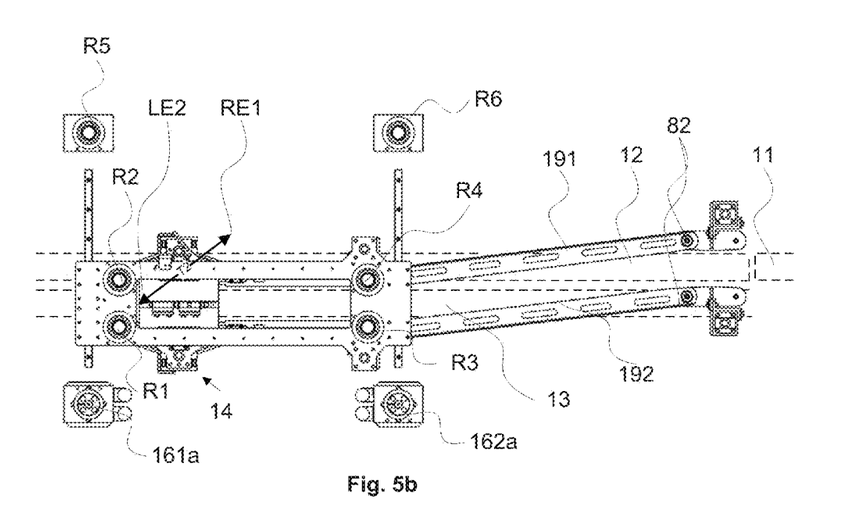

FIGS. 5a and 5b show a top view illustrating the resulting movement of the guiding device being initially position in a right hand side rearwardmost position RE1, when only a second of the two electric motors is operated, to a left hand side forwardmost position LE2. It may be noted that the resulting movement follows a second 45 degree track T2 in relation to the direction of the movement of the conveyor belts 12, 13. Moreover, the first 45 degree track T1 and the second 45 degree track T2 are separated by a 90 degree angle, as shown in FIG. 5. It may also be observed that the roller wheels R1, R2, R3, R4 move down in the horizontal plane between FIG. 5a and FIG. 5b, while the roller wheels R5, R6, and the drive wheels 161a, 162a remain stationary in the horizontal plane. In an embodiment, one 161 of the two electric motors 161, 162 is arranged at a position in a forward part of the H-bot assembly, and the other electric motor 162 is arranged in a backward part of the H-bot assembly. However, it should be noted that the electric motors may be positioned at other locations in the H-bot assembly. The position of the electric motors affect the coordinate system used by the controller software used by the system to control the movement of the guiding device in the correct manner.

In an embodiment, the divider arrangement further comprises a pair of upper guide rails 143, 144 being arranged to support the top of the packages and prevent them from tilting during movement along and across the first conveyor belt 12 and/or second conveyor belt 13.

Figure 6A:
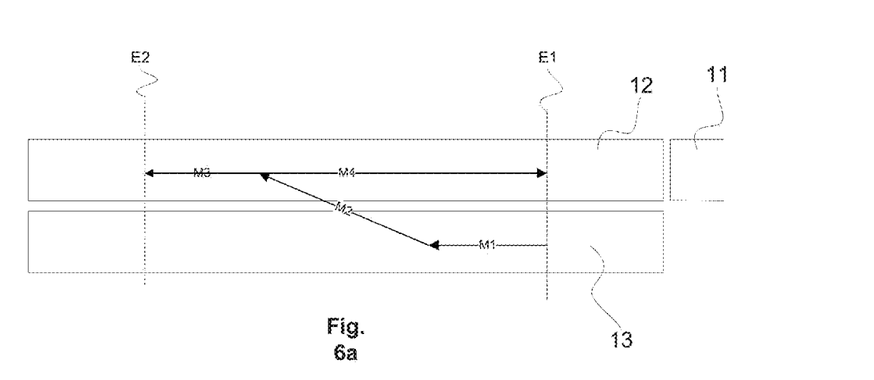
FIGS. 6*a* and 6*b* respectively illustrate the movement of the guiding device in accordance with different operating modes, and different start positions.
Figure 6B:
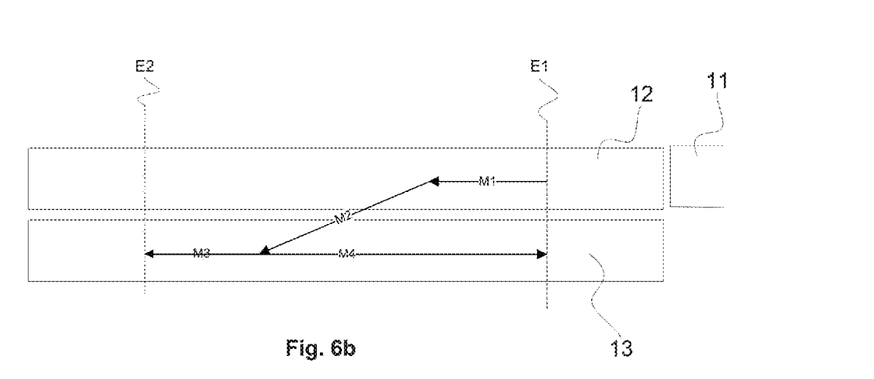

In an embodiment, in accordance with FIGS. 6a and 6b, the guiding device 14 is operable in a first mode. The first mode is activated when the guiding device 14 is positioned at a rearmost position E1 and aligned with either the first conveyor belt 12 or second conveyor belt 13. When the sensor detects the presence of a first package to be moved to the other of the first conveyor belt 12 or second conveyor belt 13, the two electric motors are arranged to accelerate the guiding device 14 being rigidly attached to the single guiding belt in a longitudinal manner in view of the direction of movement of the first conveyor belt 12 and/or second conveyor belt 13 and in a forward direction D1. The acceleration is performed while the package is detected by the sensor. Since the sensor is placed at a distance, e.g. 17 mm, from the forwardmost end of the first pair of guide rails, it is possible to detect the presence of the package before the package passes the forwardmost end of the first pair of guide rails, and thus allow for a smooth acceleration of the guiding device from null movement up to the speed S1 at which the packages are transported by means of the first conveyor belt 12 and/or second conveyor belt 13. The smooth acceleration drastically reduces the wear of the divider arrangement, and in particular the wear of the electric motors. The first mode of operation ends when the guiding device has reached a speed being identical the speed of the first conveyor belt 12 and/or second conveyor belt 13. The resulting schematic track of the guiding device in the first mode is indicated in FIGS. 6a and 6b by M1.

In an embodiment, the guiding device is operable in a second mode. The second mode is activated at the termination of the first mode or in other words once the guiding device 14 has been accelerated to the speed S1 of the first conveyor belt 12 and/or second conveyor belt 13. In the second mode the two electric motors are arranged to move the guiding device 14 to the other of the first conveyor belt 12 and/or second conveyor belt 13 by means of the guiding belt 15, while maintaining the speed S1 of the guiding device 14 in the longitudinal direction. Hence, in the second mode the guiding device is moved based on a speed vector having both a longitudinal component with a size or scalar being identical to S1, and a lateral component.

The lateral component of the speed vector of the second mode may have a size or scalar being predetermined based on the fact that the lateral movement of the guiding device needs to be completed before the guiding device reaches its forwardmost end position. Hence, the size and scalar of the lateral component of the speed vector in the second mode may be based on the speed S1, the remaining distance to the longitudinal end position of the guiding device or a distance (associated with the third mode described below) from the longitudinal end position, and the lateral distance between the two conveyor belts between which the movement is to be conducted. The schematic resulting track of the guiding device in the second mode is indicated in FIGS. 6a and 6b by M2.

In an embodiment, the guiding device is operable in a third mode. The third mode is activated at the termination of the second mode or in other words once the guiding device has been moved to the other of the first conveyor belt 12 and/or second conveyor belt 13. In the third mode the two electric motors are arranged continue moving the guiding device in a longitudinal direction only, i.e. in the direction of movement of the first conveyor belt 12 and/or second conveyor belt 13 initially at the speed S1. In the third mode the guiding device is smoothly slowed to zero speed, thereby reducing the strain on the system. The third mode assures that the packages are stabilised in the longitudinal direction before exiting the divider arrangement. Accordingly, the third mode reduces the risk of misalignment and before exiting the divider arrangement. The schematic resulting track of the third mode is indicated by M3 in FIGS. 6a and 6b.

In an embodiment, the guiding device is operable in a fourth mode. The fourth mode is activated at the termination of the third mode or at the latest once the guiding device 17 has reached its forwardmost end position E2. In the fourth mode the two electric motors 161, 162 are arranged move the guiding device in a longitudinal manner in a direction opposite that of the direction of movement of the first conveyor belt 12 and/or the second conveyor belt 13. In other words the guiding device is moved backwards in a direction parallel to that of the first conveyor belt 12 and/or second conveyor belt 13 in the fourth mode. The speed S2 at which the guiding device moves in the fourth mode is dependent on the type of application. Key parameters relate to the speed S1 of the conveyor belt over which the guiding device is presently aligned, as well as the number of packages that are to be divided out in each batch. Based on these two parameters the amount of time available for the guiding device to move from its forwardmost end position E2 to its rearwardmost end position E1, gives the lowest speed possible for guiding device to move backwards to its rearwardmost end position. The schematic resulting track of the fourth mode is indicated by M4 in FIGS. 6a and 6b.

For example, if the speed S2 is set twice to that of the speed S1, the guiding device reaches the rearmost end position when a package which before the movement of the guiding device was position at E1 has moved half way through the divider arrangement. It should be appreciated that S2 may be set to any speed. In some applications S2 could be set higher, lower or equal to S1. For example, if S2 is set to a lower value that S1 the batch size, i.e. the number of packages that are divided out, will increase. For example, if S2 is set to a value being higher the S1, the batch size will be reduced. In general, the higher the speed of S2 the higher the strain on the system will be. Hence, it is an aim to keep S2 as low as possible while still obtaining a certain batch size.

Figure 7:
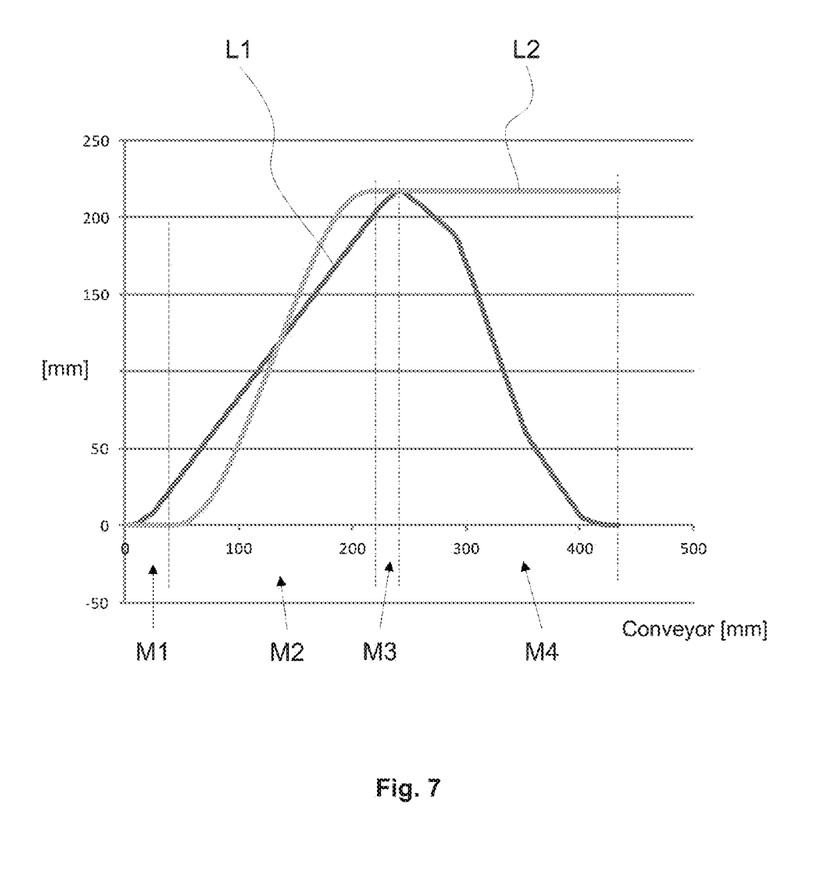
FIG. 7 illustrates a chart showing the longitudinal movement and lateral movement of the guiding device during the first mode M1, second mode M2, third mode M3, and fourth mode M4 according to an embodiment.

It should be noted that the movements M1, M2, M3, M4 made in view of FIGS. 6a and 6b should only be seen as the main aspects of the movement made. As is shown in FIG. 7 both the longitudinal and lateral movement in each of the four modes are subject to acceleration and deceleration. Hence, the actual resulting track of the movement made by the guiding device in view of FIGS. 6a and 6b in some embodiments follows a smooth curvature instead of the straight lines as shown in FIGS. 6a and 6b. The smooth curvature allows for maintaining the stability of the packages while being moved as well as reducing the overall strain on the system.

FIG. 7 illustrates a chart showing the longitudinal movement L1 and lateral movement L2 of the guiding device during the first mode M1, second mode M2, third mode M3, and fourth mode M4.

In an embodiment, the divider arrangement further comprises a second pair of guide rails 181, 182, along which first pair of guide rails of the guiding device may move in a direction parallel to the first conveyor belt 12 and/or the second conveyor belt 13. The second pair of guiding rails may be provided with an elongated slot along their extension thereof for creating a sliding connection to the guiding device which may be connected to the second pair of rails by means of the elongated slot 71 and a pin 72 being attached to the guiding device and allowed to slide in the elongated slot 71. The elongated slot may be observed in FIG. 2. The guiding device 14 acts as a telescopic extension arm in view of the second pair of guide rails 181, 182. The second pair of guide rails 181, 182 always remains directed parallel to the direction of movement of the first conveyor belt 12 and/or second conveyor belt 13. However, upon lateral movement of the guiding device the second pair of guide rails 181, 182 follows along in a lateral direction in relation to the direction of movement of the first conveyor belt 12 and/or the second conveyor belt 13.

In an embodiment, the divider arrangement further comprises a third pair of guide rails 191, 192. Each of the third guide rails of the third pair of guide rails may be connected at a forwardmost end to a rearmost end of one of the second guide rails of the second pair of guide rails 181, 182 by means of a first attachment arrangement 81. When attached, this first attachment arrangement 81 allows each third guide rail 191, 192 to rotate in relation the second guide rail to which it is attached. Each of the third guide rails 191, 192 are rotatably connected at a rearmost end at one side of the package transporting conveyor belt 11 by means of a second attachment arrangement 82.

In an embodiment, the second attachment arrangement 82 is configured to allow for a third guide rail 191, 192 to rotate in the movement plane or in other words in a plane parallel to a plane of the top surface of the package transporting conveyor belt in relation to said second attachment arrangement 82. The second attachment arrangement 82 thus allows for a package to be moved move from the package transporting conveyor belt 11 to either the first conveyor belt or the second conveyor belt by rotation of the third pair of guide rails 191, 192 around their respective second attachment arrangement 82.

Figure 8A:
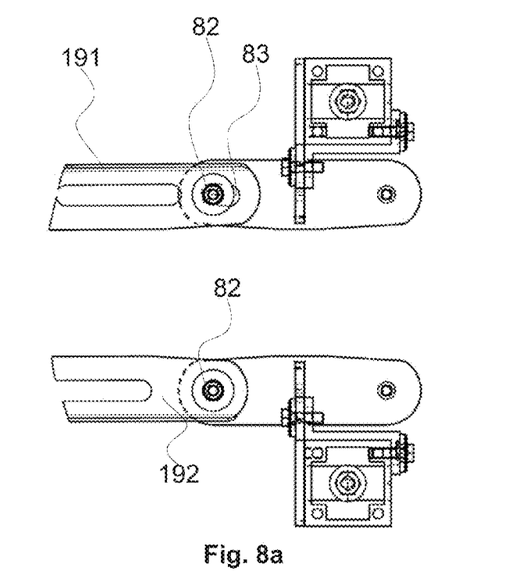
FIGS. 8*a* and 8*b* is a top view showing a first attachment arrangement according to an embodiment.
Figure 8B:
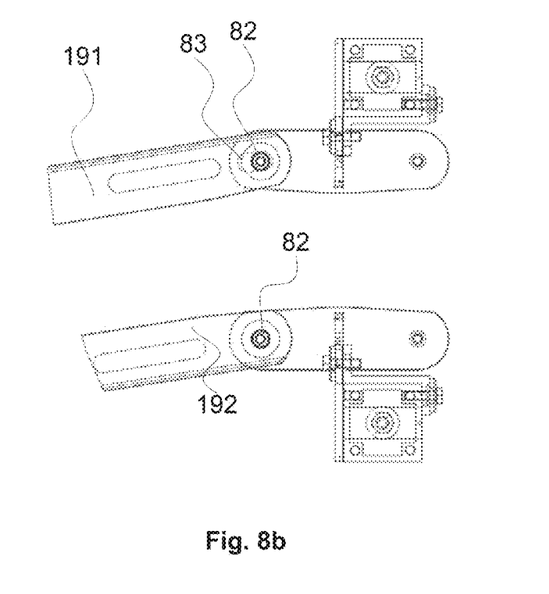

In an embodiment, as shown in association with FIGS. 8a and 8b, the first attachment arrangement 81 and/or the second attachment arrangement is provided with an angled slot 83 provided straight through each of the third guide rails 191, 192. FIGS. 8a and 8b show the third pair of guide rails in two rotational positions, corresponding to FIGS. 5a and 5b, respectively. The angled slot 83 may be provided in the third guide rail, and allows for a longitudinal and lateral displacement of the third guide rail in relation to the first 81 or second 82 attachment arrangements. For example, one of the third guide rails may be provided with an angled slot at the position of the first attachment arrangement, while the other third guide rail may be provided with an angled slot at the position of the second attachment arrangement, as shown in FIGS. 8a, 8b. The first and second attachment arrangements 81, 82 may further comprise a rod shaped structure which is arranged through the angled slot 83, thereby allowing the each third guide rail to slide in relation to the position of the rod shaped structure to which it is connected. The angled slot 83 is provided at an angle in view of the longitudinal direction of each third guide rail 191, 192, such that when the third pair of guide rails is rotated around the second attachment arrangement 82, the perpendicular distance between the two third guide rails 191, 192 is maintained constant. In other words, one could say that the angled slot is angled in a direction such that when the third guide rail is pulled away from the attachment arrangement being provided with the angled slot, the perpendicular distance to the other third guide rail is increased.

In an embodiment, the divider arrangement 10 further comprises a control unit (not shown) arranged to control the two electric motors 161, 162 and movement of the guiding device 14 according to a desired movement scheme. In an embodiment the desired movement scheme is identical to the movements defined in relation to the first mode, second mode, third mode, and fourth mode as given above.

In an embodiment, the control unit is arranged to receive an input signal from the sensor 21 and control the operation of the two electric motors 161, 162 and thereby the movement of the guiding device 14 based on the sensor input signal.

In an embodiment, the control unit is arranged to receive an input signal comprising information about the speed S1 of the first conveyor belt 12 and/or the second conveyor belt 13, and control the operation of the two electric motors 161, 162 and thereby the movement of the guiding device 14 based on this speed input signal.

In an embodiment, a method of moving incoming packages in connection to a package transporting conveyor belt from a first conveyor belt 12 to a second conveyor belt 13, wherein the first conveyor belt 12 is arranged parallel and adjacent to the second conveyor belt 13 is provided. The method comprises steps controlling movement of a guiding device 14 in a plane parallel to a top surface of the first conveyor belt 12 and/or the second conveyor belt 13 by operating two electric motors 161, 162 arranged in an H bot assembly and connected to one guiding belt 15 being rigidly attached to the guiding device 14, for controllably moving the guiding device 14 over the first conveyor belt 12 and second conveyor belt 13 in a plane parallel to the upper side of the first conveyor belt 12 and/or the second conveyor belt 13.

Figure 9:
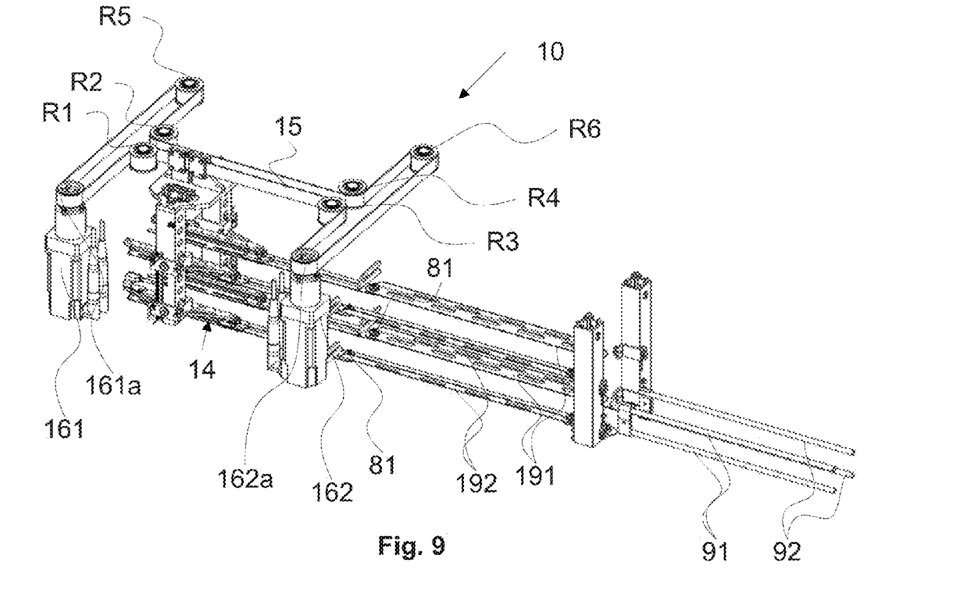
FIG. 9 is a schematic view of a divider arrangement according to an embodiment.

In an embodiment, according to FIG. 9, the divider arrangement 10 is further provided with a fourth pair of guide rails 91, 92. The fourth pair of guide rails may are provided at the sides of the package transporting conveyor belt 11 (not shown), for improved stability of the packages P entering the divider arrangement 10. In an embodiment, the method comprising steps for performing any of functionalities associated with the divider arrangement according to any one of the embodiments disclosed herein.

In an embodiment, a computer-readable medium having embodied thereon a computer program for processing by a computer is provided. The computer program comprises code segments arranged for performing all of the method steps according to any one of the embodiments disclosed herein. The code segments may comprise the controller software, as mentioned above, for correctly controlling the movement of the guiding device.

Although the above description has been made mostly with reference to one package transporting conveyor belt 11, a first conveyor belt 12 and a second conveyor belt 13, it should be appreciated that the divider arrangement is functional also for dividing packages between several further conveyor belts. Hence, the general principle of movement of the guiding device may be applied conveyor belt systems comprising at least three or more conveyor belts.

It should also be noted that the 45 degree tracks of the guiding device, as referred to in view of some embodiments, results when only one electric motor is operated. When both electric motors are operated the track of the guiding device in the movement plane is by no means limited by a 45 degree track. Instead, the guiding device may be moved in any direction in the movement plane along straight lines or curvatures any desired manner. Depending on the configuration of the H-bot pattern it could also be possible to have tracks with an angle different from 45 degrees when only one electric motor is operating. It should thus be appreciated that the present invention is not limited only to 45 degree tracks, but any track angle is possible within the scope defined herein. An advantage of the resulting 45 degree track when operating only one electric motor is that the coordinate system is using the factor $\sqrt{2}$, which allows for reduced complexity when translating the desired guiding device tracks into code segments being used to control the operation of the two electric motors.

Further, the invention has mainly been described with reference to a few embodiments. However, as is readily understood by a person skilled in the art, other embodiments than the ones disclosed above are equally possible within the scope of the invention, as defined by the appended claims.

The invention claimed is:

1. A divider arrangement, arranged in connection to a package transporting conveyor belt, for moving incoming packages from a first conveyor belt to a second conveyor belt, wherein the first conveyor belt is arranged parallel and adjacent to the second conveyor belt, comprising:
a guiding device including a pair of lower guide rails between which the packages are transportable by the first conveyor belt and/or the second conveyor belt; and
wherein the guiding device is rigidly attached to a guiding belt being connected to two electric motors in an H-bot assembly for controllably moving the pair of lower guide rails over the first conveyor belt and second conveyor belt in a plane parallel to a top surface of the first conveyor belt and/or the second conveyor belt.

2. The divider arrangement according to claim 1, wherein the two electric motors allows for the guiding device to move both longitudinally and laterally in view of direction of movement of the first conveyor belt and/or the second conveyor belt.

3. The divider arrangement according to claim 1, wherein a sensor is positioned at a distance from the forwardmost end of the pair of lower guide rails, the sensor being configured to detect the presence of a package being transported between the pair of lower guide rails, wherein said distance is not larger than depth of the package in the direction of movement.

4. The divider arrangement according to claim 1, wherein each of the two electric motors by way of the guiding belt is positioned such that when only one of the electric motors is operating the guiding device is moved in a 45 degree angle in view of the longitudinal axis of the first conveyor belt and/or second conveyor belt.

5. The divider arrangement according to claim 1, wherein one of the two electric motors is arranged at a position in a forward part of the H-bot assembly, and the other electric motor is arranged in a backward part of the H-bot assembly.

6. The divider arrangement according to claim 1, wherein the guiding device further comprises a pair of upper guide rails arranged to support the top of the packages and prevent them from tilting when transported on the first conveyor belt and/or second conveyor belt.

7. The divider arrangement according to claim 3, wherein the guiding device is operable in a first mode, which is activated when the guiding device is positioned at a rearmost position and aligned with either the first conveyor belt or second conveyor belt, such that when the sensor detects a first package to be moved to the other of the first conveyor belt or second conveyor belt, wherein the two electric motors are arranged to accelerate the guiding device by the guiding belt, in a direction parallel to that of the first conveyor belt and/or second conveyor belt and in a forward direction, up to a speed being identical the speed of the first conveyor belt and/or second conveyor belt.

8. The divider arrangement according to claim 7, wherein the guiding device is operable in a second mode, which is activated once the guiding device has been accelerated to the speed of the first conveyor belt and/or second conveyor belt, wherein the two electric motors are arranged to move the guiding device to the other of the first conveyor belt and/or second conveyor belt by the guiding belt, while maintaining the speed of the guiding device in the longitudinal direction.

9. The divider arrangement according to claim 8, wherein the two electric motors are arranged to move the guiding device to the other of the first conveyor belt and/or second conveyor belt, while maintaining the speed in the longitudinal direction, before reaching the forwardmost end position of the guiding device.

10. The divider arrangement according to claim 8, wherein the guiding device is operable in a third mode, which is activated once the guiding device has been moved to the other of the first conveyor belt and/or second conveyor belt, wherein the two electric motors are arranged continue moving the guiding device in a direction parallel to that of the first conveyor belt and/or second conveyor belt at the speed of the first conveyor belt and/or second conveyor belt.

11. The divider arrangement according to claim 10, wherein the guiding device is operable in a fourth mode, which is activated following the third mode and at the latest once the guiding device has reached its forwardmost position, wherein the two electric motors are arranged move the guiding device in a direction parallel to that of the first conveyor belt and/or second conveyor belt and in a backward direction at a predetermined speed.

12. The divider arrangement according to claim 1, further comprising a second pair of guide rails, along which the first pair of guide rails of the guiding device is slidable in a direction parallel to the first conveyor belt and/or the second conveyor belt, wherein the guiding device acts as a telescopic extension arm in view of the second pair of guide rails.

13. The divider arrangement according to claim 12, further comprising a third pair of guide rails being rotatably attached at a forwardmost end to a rearmost end of the second pair of guide rails by a first attachment arrangement and attached at a rearmost end at either side of the package transporting conveyor belt by a second attachment arrangement.

14. The divider arrangement according to claim 13, wherein each third guide rail of the third pair of guide rails at the position of the first attachment arrangement is provided with an angled slot being provided straight through each of the third guide rails, along which angled slot a rod shaped structure of the first attachment arrangement is slidable, thereby allowing for maintaining a constant distance between the third pair of guide rails when rotated in view of the second attachment arrangement.

15. The divider arrangement according to claim 13, wherein each second attachment arrangement is configured to allow for a guide rail of the third pair of guide rails to rotate in a plane parallel to a plane of the upper side of the package transporting conveyor belt in relation to said attachment arrangement, thereby allowing a package to be moved move from the package transporting conveyor belt to either the first conveyor belt or the second conveyor belt by rotation of the third pair of guide rails around their respective second attachment arrangement.

16. The divider arrangement according to claim 1, further comprising a control unit arranged to control the two electric motors and movement of the guiding device according to a desired movement scheme.

17. The divider arrangement according to claim 15, comprising a control unit arranged to control the two electric motors and movement of the guiding device according to a desired movement scheme, and a sensor positioned at a distance from a forwardmost end of the pair of lower guide rails and configured to detect presence of a package being transported between the pair of lower guide rails, and wherein the control unit is arranged to receive an input signal from the sensor and control the operation of the two electric motors and thereby the movement of the guiding device based on the sensor input signal.

18. The divider arrangement according to claim 15, wherein the control unit is arranged to receive an input signal comprising information about the speed of the first conveyor belt and/or the second conveyor belt, and control the operation of the two electric motors and thereby the movement of the guiding device based on this speed input signal.

19. A method of moving incoming packages in connection to a package transporting conveyor belt from a first conveyor belt to a second conveyor belt, wherein the first conveyor belt is arranged parallel and adjacent to the second conveyor belt, comprising:

controlling movement of a guiding device in a plane parallel to a top surface of the first conveyor belt and/or the second conveyor belt, wherein the movement is controlled by operating two electric motors arranged in an H-bot assembly and connected to a guiding belt being rigidly attached to the guiding device, for controllably moving the guiding device in a plane parallel to the upper side of the first conveyor belt and/or the second conveyor belt.

20. A non-transitory computer-readable medium having embodied thereon a computer program for processing by a computer, the computer program comprising code segments configured for:

controlling movement of a guiding device in a plane parallel to a top surface of a first conveyor belt and/or a second conveyor belt, the first conveyor belt being arranged parallel and adjacent to the second conveyor belt, the movement being controlled by operating two electric motors arranged in an H-bot assembly and connected to a guiding belt being rigidly attached to the guiding device, for controllably moving the guiding device in a plane parallel to the upper side of the first conveyor belt and/or the second conveyor belt.

* * * * *